(12) United States Patent
Carter et al.

(10) Patent No.: US 8,558,408 B2
(45) Date of Patent: Oct. 15, 2013

(54) SYSTEM AND METHOD FOR PROVIDING REDUNDANT POWER TO A DEVICE

(75) Inventors: Roy Anthony Carter, Salem, VA (US); John Robert Booth, Hardy, VA (US); John Isler, III, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 87 days.

(21) Appl. No.: 12/893,635

(22) Filed: Sep. 29, 2010

(65) Prior Publication Data
US 2012/0074788 A1   Mar. 29, 2012

(51) Int. Cl.
*H02J 3/00*   (2006.01)

(52) U.S. Cl.
USPC .................................. 307/80; 307/43; 307/64

(58) Field of Classification Search
USPC ............................................... 307/43, 64, 80
See application file for complete search history.

(56) References Cited

U.S. PATENT DOCUMENTS

| | | |
|---|---|---|
| 3,600,669 A | 8/1971 | McClain |
| 3,624,684 A | 11/1971 | McCaslin |
| 3,821,856 A | 7/1974 | Rapp |
| 3,841,759 A | 10/1974 | Turner |
| 3,939,704 A | 2/1976 | Zipin |
| 3,956,741 A | 5/1976 | Kraus |
| 4,016,784 A | 4/1977 | Brown |
| 4,024,524 A | 5/1977 | Kwiatkowski |
| 4,030,085 A | 6/1977 | Ellis et al. |
| 4,038,756 A | 8/1977 | Smith et al. |
| 4,100,480 A | 7/1978 | Lytle et al. |
| 4,115,923 A | 9/1978 | Smith et al. |
| 4,129,189 A | 12/1978 | Maglecic et al. |
| 4,138,821 A | 2/1979 | Wilks |
| 4,140,998 A | 2/1979 | Bettle |
| 4,142,296 A | 3/1979 | Miller |
| 4,167,874 A | 9/1979 | Grant |
| 4,182,168 A | 1/1980 | Desch |
| 4,216,795 A | 8/1980 | Cobb et al. |
| 4,237,445 A | 12/1980 | Crossman |
| 4,281,537 A | 8/1981 | Burbank, III |
| 4,292,740 A | 10/1981 | Vis et al. |
| 4,306,208 A | 12/1981 | Coors |
| 4,331,026 A | 5/1982 | Howard et al. |
| 4,366,718 A | 1/1983 | Nelson |
| 4,380,295 A | 4/1983 | Soderberg et al. |
| 4,406,191 A | 9/1983 | Armitage |
| 4,419,829 A | 12/1983 | Miller |
| 4,419,830 A | 12/1983 | Miller |
| 4,425,061 A | 1/1984 | Kindl et al. |
| 4,435,905 A | 3/1984 | Bryan |
| 4,450,404 A | 5/1984 | Williams et al. |
| 4,463,605 A | 8/1984 | McDowell et al. |
| 4,487,079 A | 12/1984 | Compton et al. |
| 4,490,913 A | 1/1985 | Vis |
| 4,503,616 A | 3/1985 | Pullen |
| 4,505,158 A | 3/1985 | Maples |

(Continued)

*Primary Examiner* — Adi Amrany
(74) *Attorney, Agent, or Firm* — Cantor Colburn LLP

(57) ABSTRACT

A system for providing power to a device includes a first power supply unit having a first power module that provides A.C. power and is selectively connectable to input lines and a first communication module. The system also includes a second power supply unit having a second power module selectively connectable to the input lines and that provides A.C. power and a second communication module coupled to the first communication module. Only one of the first or second power supply units is coupled to the input lines at a given time.

16 Claims, 5 Drawing Sheets

(56) References Cited

U.S. PATENT DOCUMENTS

| | | | |
|---|---|---|---|
| 4,510,814 A | 4/1985 | Espiritu Santo et al. |
| 4,514,689 A | 4/1985 | Gerard |
| 4,524,624 A | 6/1985 | Di Noia et al. |
| 4,530,367 A | 7/1985 | Desjardins et al. |
| 4,543,732 A | 10/1985 | Maples |
| 4,546,656 A | 10/1985 | Grundy et al. |
| 4,548,085 A | 10/1985 | Grundy |
| 4,551,882 A | 11/1985 | Swersey et al. |
| 4,554,624 A | 11/1985 | Wickham et al. |
| 4,570,354 A | 2/1986 | Hindes |
| 4,579,003 A | 4/1986 | Riley |
| 4,584,658 A | 4/1986 | Ottobre et al. |
| 4,587,739 A | 5/1986 | Holcomb et al. |
| 4,628,499 A | 12/1986 | Hammett |
| 4,678,991 A | 7/1987 | Schmidt |
| 4,733,567 A | 3/1988 | Serata |
| 4,750,489 A | 6/1988 | Berkman et al. |
| 4,762,003 A | 8/1988 | Cioletti |
| 4,771,958 A | 9/1988 | Hewitt |
| 4,776,610 A | 10/1988 | Moog |
| 4,808,958 A | 2/1989 | Hewitt et al. |
| 4,814,680 A | 3/1989 | Hulsing |
| 4,836,035 A | 6/1989 | Tcheng et al. |
| 4,838,173 A | 6/1989 | Schroeder et al. |
| 4,841,844 A | 6/1989 | Tootle |
| 4,843,346 A | 6/1989 | Heyman et al. |
| 4,844,427 A | 7/1989 | Pedersen |
| 4,855,667 A | 8/1989 | Hendrick et al. |
| 4,862,098 A | 8/1989 | Yassa et al. |
| 4,888,540 A | 12/1989 | Terpstra et al. |
| 4,893,077 A | 1/1990 | Auchterlonie |
| 4,893,078 A | 1/1990 | Auchterlonie |
| 4,899,102 A | 2/1990 | Hendrick et al. |
| 4,904,921 A | 2/1990 | DeVito et al. |
| 4,906,924 A | 3/1990 | Zannis |
| 4,916,391 A | 4/1990 | Doerman et al. |
| 4,972,721 A | 11/1990 | Conti |
| 4,982,156 A | 1/1991 | Lewis et al. |
| 4,989,329 A | 2/1991 | Pullen |
| 5,015,426 A | 5/1991 | Maus et al. |
| 5,025,214 A | 6/1991 | Ross |
| 5,033,307 A | 7/1991 | Uhri et al. |
| 5,039,279 A | 8/1991 | Natwick et al. |
| 5,063,687 A | 11/1991 | Olshefsky |
| 5,065,106 A | 11/1991 | Hendrick et al. |
| 5,066,911 A | 11/1991 | Hulsing, II |
| 5,080,189 A | 1/1992 | Cole |
| 5,087,866 A | 2/1992 | Smith |
| 5,087,894 A | 2/1992 | DeVito et al. |
| 5,124,656 A | 6/1992 | Yassa et al. |
| 5,138,184 A * | 8/1992 | Keefe ............................. 307/64 |
| 5,146,784 A | 9/1992 | Maresca, Jr. et al. |
| 5,148,167 A | 9/1992 | Ribner |
| 5,172,781 A | 12/1992 | Hlavinka et al. |
| 5,187,987 A | 2/1993 | Anderson et al. |
| 5,189,808 A | 3/1993 | Evans et al. |
| 5,275,063 A | 1/1994 | Steiger et al. |
| 5,295,887 A | 3/1994 | Zdanowski |
| 5,323,543 A | 6/1994 | Steen et al. |
| 5,327,030 A | 7/1994 | DeVito et al. |
| 5,345,309 A | 9/1994 | Wertz et al. |
| 5,367,258 A | 11/1994 | Philpot |
| 5,398,194 A | 3/1995 | Brosh et al. |
| 5,414,939 A | 5/1995 | Waugaman |
| 5,422,555 A | 6/1995 | Paige |
| 5,448,882 A | 9/1995 | Dyer et al. |
| 5,450,745 A | 9/1995 | Flaherty |
| 5,469,053 A | 11/1995 | Laughlin |
| 5,477,473 A | 12/1995 | Mandl et al. |
| 5,557,267 A | 9/1996 | Poduje et al. |
| 5,576,485 A | 11/1996 | Serata |
| 5,645,738 A | 7/1997 | Cecil |
| 5,652,659 A | 7/1997 | Bornhorst, Jr. et al. |
| 5,708,368 A | 1/1998 | Mallory |
| 5,731,761 A | 3/1998 | Sychra |
| 5,739,594 A * | 4/1998 | Sheppard et al. ............... 307/64 |
| 5,746,645 A | 5/1998 | Beal et al. |
| 5,761,772 A | 6/1998 | Clapp et al. |
| 5,774,940 A | 7/1998 | Clapp et al. |
| 5,774,942 A | 7/1998 | Clapp et al. |
| 5,774,943 A | 7/1998 | Clapp et al. |
| 5,796,220 A | 8/1998 | Clapp et al. |
| 5,801,645 A | 9/1998 | Erickson et al. |
| 5,806,806 A | 9/1998 | Boehringer et al. |
| 5,808,904 A | 9/1998 | Rasmussen et al. |
| 5,828,028 A | 10/1998 | Cecil |
| 5,831,235 A | 11/1998 | Cecil |
| 5,846,160 A | 12/1998 | Tuday |
| 5,851,559 A | 12/1998 | Scribner et al. |
| 5,901,633 A | 5/1999 | Chan et al. |
| 5,923,435 A | 7/1999 | Bornhorst, Jr. et al. |
| 5,939,799 A * | 8/1999 | Weinstein ....................... 307/64 |
| 5,939,802 A * | 8/1999 | Hornbeck ....................... 307/87 |
| 5,977,778 A | 11/1999 | Chan et al. |
| 6,005,395 A | 12/1999 | Chan et al. |
| 6,025,787 A | 2/2000 | Poduje et al. |
| 6,051,893 A * | 4/2000 | Yamamoto et al. ............. 307/43 |
| 6,069,473 A | 5/2000 | Hatley |
| 6,142,059 A | 11/2000 | Chan et al. |
| 6,145,370 A | 11/2000 | Evans |
| 6,196,077 B1 | 3/2001 | Lee |
| 6,234,061 B1 | 5/2001 | Glasson |
| 6,240,246 B1 | 5/2001 | Evans |
| 6,267,349 B1 | 7/2001 | Gomes et al. |
| 6,279,699 B1 | 8/2001 | Hester et al. |
| 6,286,377 B1 | 9/2001 | Benke et al. |
| 6,321,886 B2 | 11/2001 | Hester et al. |
| 6,330,176 B1 * | 12/2001 | Thrap et al. ................... 363/142 |
| 6,404,184 B1 | 6/2002 | Tabrizi |
| 6,450,299 B1 | 9/2002 | Lysaght |
| 6,489,760 B2 | 12/2002 | Kim et al. |
| 6,519,864 B1 | 2/2003 | Jones et al. |
| 6,527,438 B2 | 3/2003 | Zollinger et al. |
| 6,539,807 B1 | 4/2003 | Wohlrab et al. |
| 6,588,313 B2 | 7/2003 | Brown et al. |
| 6,605,940 B1 | 8/2003 | Tabrizi et al. |
| 6,630,753 B2 * | 10/2003 | Malik et al. .................... 307/64 |
| 6,656,135 B2 | 12/2003 | Zogbi et al. |
| 6,694,861 B2 | 2/2004 | Glasson |
| 6,702,069 B2 | 3/2004 | Ralea et al. |
| 6,721,036 B2 | 4/2004 | Scheiberlich et al. |
| 6,722,260 B1 | 4/2004 | Brown |
| 6,722,261 B1 | 4/2004 | Brown et al. |
| 6,725,731 B2 | 4/2004 | Wiklund et al. |
| 6,783,108 B2 | 8/2004 | Jansen |
| 6,789,458 B2 | 9/2004 | Schumacher et al. |
| 6,810,906 B2 | 11/2004 | Tanaka et al. |
| 6,817,067 B2 | 11/2004 | Kopp et al. |
| 6,817,252 B2 | 11/2004 | Wiklund et al. |
| 6,844,720 B1 | 1/2005 | Pokrywka |
| 6,848,323 B2 | 2/2005 | Krouth et al. |
| 6,871,617 B1 | 3/2005 | Winstead et al. |
| 6,876,103 B2 * | 4/2005 | Radusewicz et al. ........... 307/64 |
| 6,879,274 B2 | 4/2005 | Nestler et al. |
| 6,907,677 B1 | 6/2005 | Hartman |
| 6,911,819 B1 | 6/2005 | Tabrizi |
| 6,967,726 B2 | 11/2005 | King et al. |
| 7,019,514 B2 | 3/2006 | Tabrizi |
| 7,034,527 B2 | 4/2006 | Low et al. |
| 7,038,443 B2 | 5/2006 | Proksch et al. |
| 7,049,810 B1 | 5/2006 | Stava |
| 7,052,174 B2 | 5/2006 | Korhonen |
| 7,053,603 B2 | 5/2006 | Swart |
| 7,075,196 B1 | 7/2006 | Labriola, II |
| 7,108,107 B2 | 9/2006 | Ralea et al. |
| 7,138,794 B1 | 11/2006 | Cook et al. |
| 7,205,775 B2 | 4/2007 | Kreit |
| 7,231,849 B2 | 6/2007 | Beattie |
| 7,233,140 B2 | 6/2007 | Proksch et al. |
| 7,246,023 B2 | 7/2007 | Bhateja et al. |
| 7,248,994 B1 | 7/2007 | Stolan |
| 7,259,553 B2 | 8/2007 | Arns, Jr. et al. |
| 7,262,592 B2 | 8/2007 | Proksch et al. |
| 7,271,582 B2 | 9/2007 | Proksch et al. |

(56) References Cited

U.S. PATENT DOCUMENTS

| | | |
|---|---|---|
| 7,276,897 B2 | 10/2007 | Lee |
| 7,290,476 B1 | 11/2007 | Glasson |
| 7,298,137 B2 | 11/2007 | Howard et al. |
| 7,319,319 B2 | 1/2008 | Jones et al. |
| 7,372,254 B2 | 5/2008 | Proksch et al. |
| 7,387,236 B2 | 6/2008 | Jantsch |
| 7,391,202 B2 | 6/2008 | Brandt et al. |
| 7,407,090 B2 | 8/2008 | Jantsch |
| 7,430,880 B2 | 10/2008 | Butts et al. |
| 7,439,733 B2 | 10/2008 | Arns, Jr. et al. |
| 7,449,878 B2 | 11/2008 | Lee |
| 7,459,904 B2 | 12/2008 | Proksch et al. |
| 7,464,292 B2 * | 12/2008 | Zansky et al. .................. 714/14 |
| 7,495,356 B2 * | 2/2009 | Kuo ................................ 307/64 |
| 7,514,919 B2 | 4/2009 | James et al. |
| 7,532,115 B2 | 5/2009 | Neill |
| 7,538,460 B2 | 5/2009 | Labriola, II |
| 7,538,544 B2 | 5/2009 | Lee |
| 7,540,467 B2 | 6/2009 | Roundy |
| 7,872,376 B2 * | 1/2011 | Huang ........................... 307/87 |
| 8,232,680 B2 * | 7/2012 | DiMarco et al. ............... 307/85 |
| 2001/0018861 A1 | 9/2001 | Glasson |
| 2002/0031165 A1 | 3/2002 | Zollinger et al. |
| 2002/0039694 A1 | 4/2002 | Scheiberlich et al. |
| 2002/0175677 A1 | 11/2002 | Proksch et al. |
| 2003/0029680 A1 | 2/2003 | Ralea et al. |
| 2003/0052289 A1 | 3/2003 | Jansen |
| 2004/0020532 A1 | 2/2004 | Tanaka et al. |
| 2004/0056653 A1 | 3/2004 | Bocek et al. |
| 2004/0075428 A1 | 4/2004 | Proksch et al. |
| 2004/0128812 A1 | 7/2004 | Beattie |
| 2004/0163386 A1 | 8/2004 | Kopp et al. |
| 2004/0227507 A1 | 11/2004 | Swart |
| 2005/0046593 A1 | 3/2005 | Tulpule et al. |
| 2005/0073694 A1 | 4/2005 | King et al. |
| 2005/0109565 A1 | 5/2005 | Ralea et al. |
| 2005/0168073 A1 * | 8/2005 | Hjort .............................. 307/65 |
| 2005/0237053 A1 | 10/2005 | Tabrizi |
| 2005/0283330 A1 | 12/2005 | Laraia et al. |
| 2006/0011002 A1 | 1/2006 | Rashleger |
| 2006/0056483 A1 | 3/2006 | Korhonen |
| 2006/0186876 A1 | 8/2006 | Proksch et al. |
| 2006/0186877 A1 | 8/2006 | Proksch et al. |
| 2006/0186878 A1 | 8/2006 | Proksch et al. |
| 2006/0192551 A1 | 8/2006 | Proksch et al. |
| 2006/0197393 A1 | 9/2006 | Labriola |
| 2006/0202683 A1 | 9/2006 | Proksch et al. |
| 2006/0278120 A1 | 12/2006 | Campbell et al. |
| 2007/0125607 A1 | 6/2007 | Ralea et al. |
| 2007/0152459 A1 | 7/2007 | Fisher et al. |
| 2007/0179738 A1 | 8/2007 | Stolan |
| 2007/0194783 A1 | 8/2007 | Brandt et al. |
| 2007/0200559 A1 | 8/2007 | Proksch et al. |
| 2008/0150363 A1 * | 6/2008 | Kuo ................................ 307/64 |
| 2008/0203337 A1 | 8/2008 | Roundy |
| 2008/0203338 A1 | 8/2008 | Roundy |
| 2009/0086830 A1 | 4/2009 | Buisson |
| 2009/0284077 A1 * | 11/2009 | Huang ........................... 307/80 |
| 2010/0038188 A1 | 2/2010 | Cahill |
| 2011/0148204 A1 * | 6/2011 | DiMarco et al. ............... 307/65 |

\* cited by examiner

SYSTEM AND METHOD FOR PROVIDING REDUNDANT POWER TO A DEVICE

BACKGROUND OF THE INVENTION

The subject matter disclosed herein relates to providing power and, in particular, to providing redundant power to a device.

Several types of devices require redundant power supplies of power to ensure proper operation. For example, consider the case of a linear variable differential transformer (LVDT) being used to measure linear displacement of an object. The LVDT typically includes three coils placed end-to-end around a core. The center coil is the primary winding and the other two coils act as secondary windings. The core is typically a cylindrical ferromagnetic core and is attached to the object whose position is to be measured.

In operation, an alternating current is driven through the primary winding, causing a voltage to be induced in each secondary windings proportional to its mutual inductance with the primary. As the core moves, these mutual inductances change, causing the voltages induced in the secondary windings to change. Based on a difference in the voltages induced in the windings, the location of the rod, and therefore the object, can be determined.

In the event that power is not supplied to the LVDT, the LVDT will give a reading that indicates that the object is at one of its possible end locations. Such an indication may cause, for example, other elements in the system where the object is located to shut down as a protection measure. For small operations, such a shut-down may not be overly problematic. On the other hand, consider the case where the LVDT is measuring the position of an object in a turbine. If power is lost to the LVDT it may cause shut down of the turbine. Such a shut down could mean that a power generation plant cannot meet its output requirements at a given time.

While an LVDT has been described, it shall be understood that any type of sensor may encounter the problems described above. In addition, devices other than sensors are also susceptible to providing invalid or misleading information when the power to them is disrupted.

BRIEF DESCRIPTION OF THE INVENTION

According to one aspect of the invention, a system for providing redundant power to a device is disclosed. The system of this aspect includes a first power supply unit having a first power module that provides A.C. power and a first communication module. The first power module is selectively connectable to input lines. The system of this aspect also includes a second power supply unit including a second power module selectively connectable to the input lines and that provides A.C. power and also having a second communication module coupled to the first communication module. In this aspect, only one of the first or second power supply units is coupled to the input lines at a given time.

According to another aspect, a method of selecting an operating state on power-on for a first power supply unit in a system configured to receive power from only one of a plurality of power supply units is disclosed. The method of this embodiment includes: powering on the first power supply; waiting for a preset time to receive communications from other power supply units; determining at the first power supply that the communications indicate that no other power supply unit is the primary; and entering a priority dispute resolution process.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
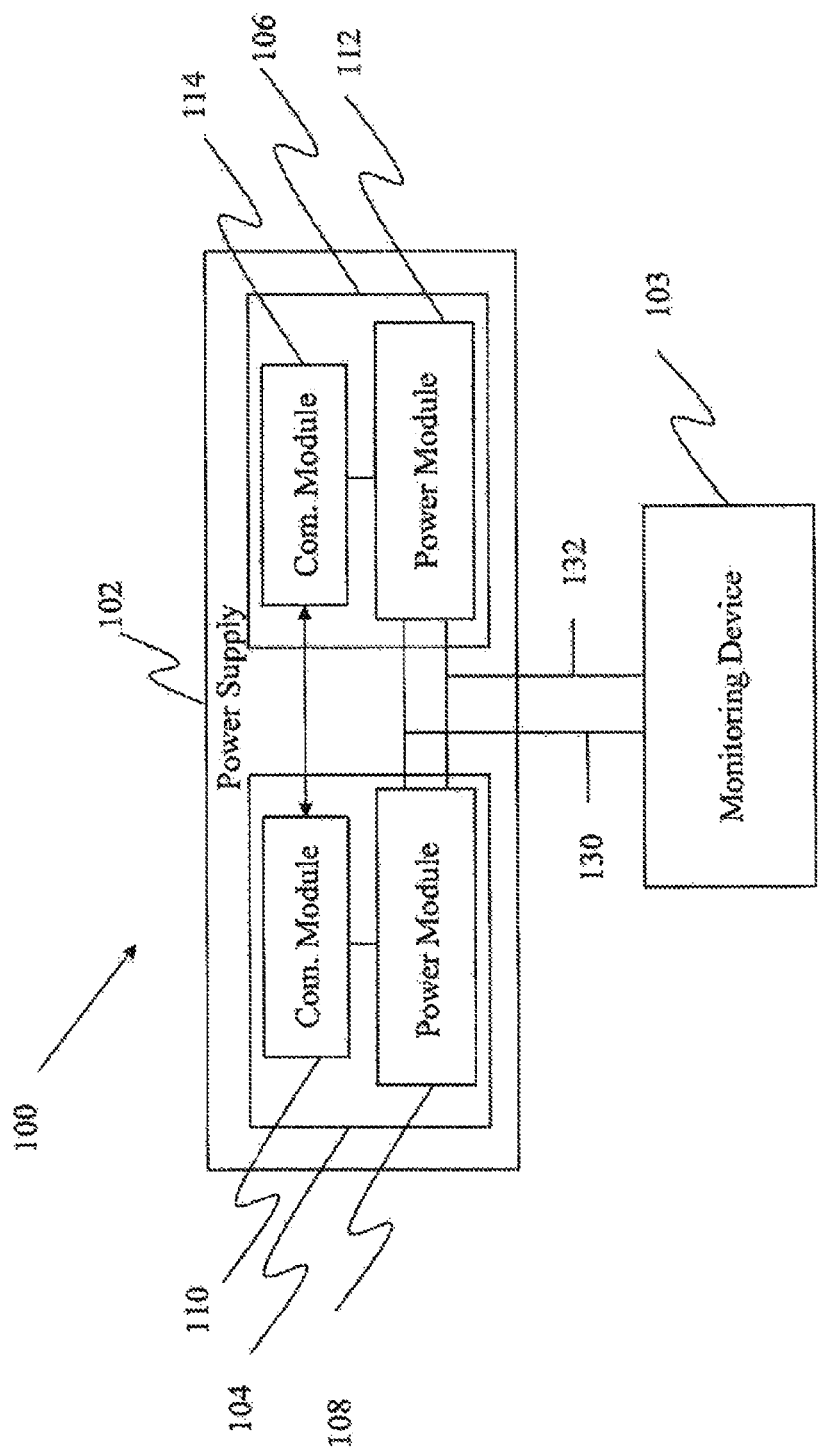
FIG. 1 is a block diagram of a system that includes two power supply units coupled to a monitoring device.

FIG. 1 is a block diagram showing an embodiment of a system 100 according to one embodiment. The system 100 of this embodiment includes a power supply 102 that provides power to a monitoring device 103. In one embodiment, the monitoring device 103 is a sensor. It shall be understood that elements other than a sensor may receive power from the power supply 102. In one embodiment, the sensor 103 is an LVDT. In another embodiment, the sensor is configured to provide different reluctance values based on position and shall be referred to herein as an LVDR.

The power supply 102 shown in FIG. 1 includes a first power supply unit 104 and a second power supply unit 106. Both the first power supply unit 104 and the second power supply unit 106 are capable of providing power to operate the monitoring device 103. In particular, the first power supply unit 104 includes a first power module 108 and the second power supply unit 106 includes a second power module 112 that produce the power. In one embodiment, the first power module 108 and the second power module 112 both provide an A.C. voltage between positive input line 130 and negative input line 132.

It shall be understood that because the power supply units 104, 106 provide A.C. power to the monitoring device 103, only one of them provides power to the monitoring device 103 at a given moment. Otherwise, phase variations between the power supply units 104, 106 could lead to variations in the voltage provided to the monitoring device 103 over time. As such, in one embodiment, only one of the first power supply unit 104 and the second power supply unit 106 provide power to the monitoring device 103 at any particular time. To this end, in one embodiment, the first power supply unit 104 and the second power supply unit 106 include control units or other means for determining which of the first power supply unit 104 and the second power supply unit 106 supplies power to the monitoring device 103 at any given time. The decision process for determining which of the first power supply unit 104 and the second power supply unit 106 is providing power is described in greater detail below.

In order for a decision of which of the first power supply unit 104 and the second power supply unit 106 are to supply power at a given moment to be made, the first power supply unit 104 and the second power supply unit 106, respectively, include a first communication module 110 and a second communication module 114. The first communication module 110 and a second communication module 114 allow the first power supply unit 104 and the second power supply unit 106 to communicate with one another. In one embodiment, the communication is bidirectional. Of course, the communication could be limited to being from the first power supply unit 104 to the second power supply unit 106 or vice-versa. The communication between the first power supply unit 104 and the second power supply unit 106 includes information about which of the units is the primary unit and the operating condition of the units, for example.

In FIG. 1 only two power supply units 104, 106 are illustrated. It shall be understood that the power supply 102 could include more than two power supply units in one embodiment. For example, according to one embodiment, the power supply 102 includes three or more power supply units coupled to the monitoring device 103.

Figure 2:
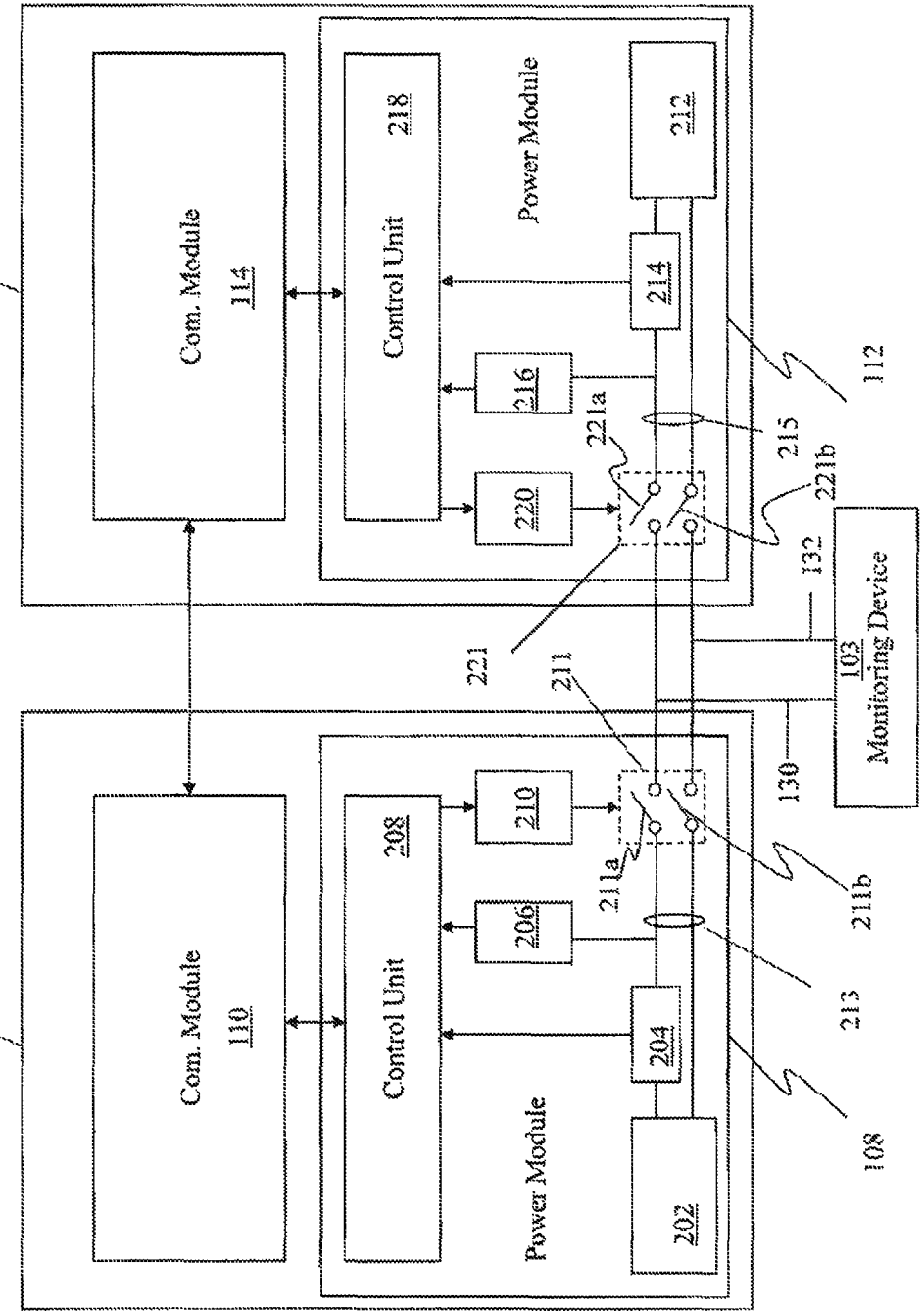
FIG. 2 is a block diagram showing the power modules of the two power supply units in greater detail.

FIG. 2 shows more detailed depictions of the first power supply unit 104 and the second power supply unit 106 of FIG. 1. In particular, the first power supply unit 104 includes a first power module 108. The first power module 108 includes a first A.C. power source 202. The first A.C. power source 202 can provide A.C. current in one embodiment and A.C. voltage in another. In one embodiment, the first A.C. power source 202 is an inverter.

The first power module 108 also includes a first current monitor 204 and a first voltage monitor 206 that measure the current and voltage, respectively, on a first set of input power lines 213. The first set of input power lines 213 are coupled to the A.C. power source 202. The measured current and voltage values are provided to a first control unit 208.

The first control unit 208, generally, controls operation of the first power module 108. The first control unit 208 also receives information from and provides information to the first communication module 110. Information provided to the first communication module 110 by the first control unit 208 includes operational status information about the first power module 108. The operational status information includes whether the first power module 108 is providing power to the monitoring device 103 as well as other operational information. Information received from the first communication module 110 includes operational status information about other power supply units (e.g., second power supply unit 106). This information includes, for example, whether the other power supply unit is providing power to the monitoring device 103.

Based on the information received from the first communication module 110 and, possibly, the current measured by the first current monitor 204 and the voltage measured by the first voltage monitor 206, the first control unit 208 determines whether the first power module 108 is to provide power to the monitoring device 103. If so, a first switch controller 210 is provided that causes a first switch unit 211 to close one or more individual switches (211a, 211b) to electrically or otherwise couple the A.C. power source 202 to input lines 130 and 132. In such a case, the first communication module 110 communicates to other power supply units an indication that the first power supply unit 104 is supplying power to the monitoring device 103. A power supply unit is referred to as a "primary power supply unit" or simply a "primary" if it is providing power. Otherwise, the power supply unit is a backup unit.

Similar to the first power supply unit 104, the second power supply unit 106 includes a second power module 112. The second power module 112 includes a second A.C. power source 212. The second A.C. power source 212 provides substantially the same type and amount of power as the first A.C. power source 202. Of course, the first A.C. power source 202 and the second A.C. power source 212 can have different phases relative to each other. In one embodiment, the second A.C. power source 212 is an inverter.

The second power module 112 also includes a second current monitor 214 and a second voltage monitor 216 that measure the current and voltage, respectively, on a second set of input power lines 215. The measured current and voltage values are provided to a second control unit 218.

The second control unit 218, generally, controls operation of the second power module 112. The second control unit 208 also receives information from and provides information to the second communication module 114. Information provided to the second communication module 114 by the second control unit 218 includes operational status information about the second power module 112. The operational status information includes whether the second power module 112 is providing power to the monitoring device 103 as well as other operational information. Information received from the second communication module 114 includes operational status information about other power supply units (e.g., first power supply unit 104). This information includes, for example, whether the other power supply unit is providing power to the monitoring device 103 (i.e., whether an other power supply unit is the "primary"). In one embodiment, the first control unit 208 and the second control unit 218 are formed by field programmable gate arrays (FPGAs).

Based on the information received from the second communication module 114 and, possibly, the current measured by the second current monitor 214 and the voltage measured by the second voltage monitor 206, the second control unit 218 determines whether the second power module 108 is to provide power to the monitoring device 103. If so, a second switch controller 220 is provided that causes a second switch unit 221 to close one or more individual switches (221a, 221b) to electrically or otherwise couple the second A.C. power source 212 to input lines 130 and 132.

Figure 3:
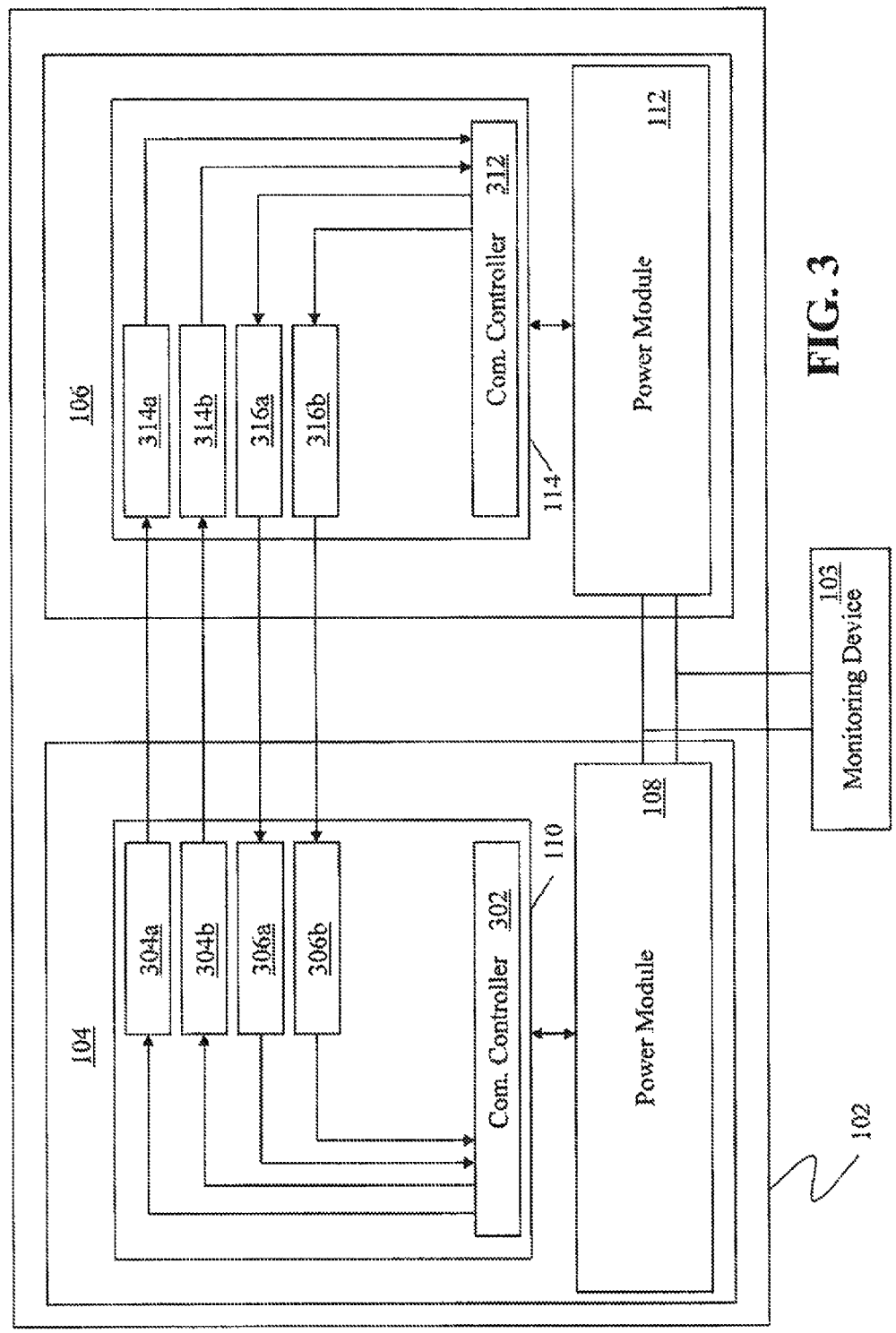
FIG. 3 is a block diagram showing the communication modules of the two power supply units in greater detail.

FIG. 3 shows more detailed depictions of the first power supply unit 104 and the second power supply unit 106 of FIG. 1. As before, the first power supply unit 104 and the second power supply unit 106 include, respectively, the first power module 108 and the second power module 112. In this illustration, the first communication module 110 and the second communication module 114 are shown in greater detail than in FIG. 1.

The first communication module 110 includes a first communication controller 302. The first communication controller 302 receives information from and provides information to the first power module 108. In addition, the first communication controller 302 transmits information to an external location through one or more first transmitters 304 and receives information from an external location through first receivers.

As illustrated, the first transmitters 304 includes a first and second first transmitter 304a, 304b, respectively. This provides for redundant transmitting capabilities. In addition, as illustrated, the first receivers 306 include a first and second first receivers, respectively. This provides for redundant receiving capabilities.

The second communication module 114 includes a second communication controller 312. The second communication controller 312 receives information from and provides information to the second power module 112. In addition, the first communication controller 312 transmits information to an external location through one or more second transmitters 316 and receives information from an external location through second receivers 314.

As illustrated, the second transmitters 316 are coupled to the first receivers 306 and the second receivers 314 are coupled to the first transmitters 304. In this manner, two transmit links from the first communication module 110 to the second communication module 114 are provided and two receive links from second communication module 114 to the first communication module 110 are provided. In this manner, a redundant communication arrangement between the first communication module 110 and the second communication module 114 is provided.

Figure 4:
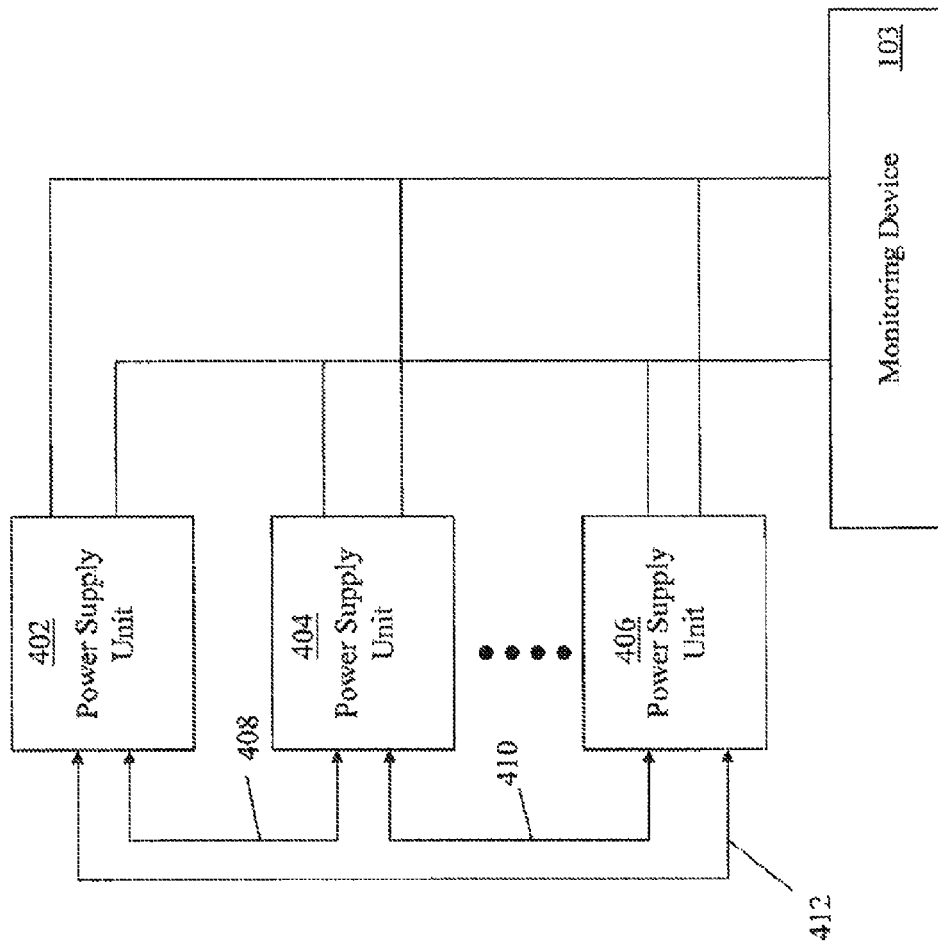
FIG. 4 shows a plurality of power supply units coupled to a monitoring device.

FIG. 4 shows a block diagram of a system 100 that includes plurality of power supply units 402, 404, 406 coupled to the monitoring device 103. Of course, it shall be understood that any number of power supply units may be provided. As illustrated, each power supply unit 402, 404, 406 is in communication with every other power supply unit 402, 404, 406. In particular, a first communication link 408 couples power supply unit 402 to power supply unit 404, a second communication link 410 couples power supply unit 404 to power supply unit 406 and a third communication link 412 couples power supply unit 402 to power supply unit 406. As indicated, the number of power supply units is not limited to three. In addition, it shall be understood that the communication links 408, 410, 412 each may support bidirectional redundant communication.

In one embodiment, each power supply unit 402, 404, 406 is given one of three different ratings. For convenience, these ratings shall be referred to herein as R, S, and T. In order of precedence, R is greater than S and S is greater than T. In one embodiment, during operation each power supply unit 402, 404, 406 transmits data message packets to all of the other power supply units at a fixed rate. In one embodiment, the fixed rate is once per millisecond but other time period can be used. In one embodiment, each data packet includes the rating of the power supply unit, an excitation switchover flag and an indication of whether the transmitting power supply unit is the primary.

As discussed above, at any given time only one power supply unit provides power to the monitoring device 103. As such, embodiments of the present invention are directed to determining which of the power supply units is to provide power to the monitoring device 103 at a given moment. In general, a power supply unit presently providing power will continue to do so until it is no longer able to or it cannot communicate with the other power supplies. In the event that the primary cannot continue providing power, the excitation switchover flag it transmits is set to indicate such. In either failure case, the other power supply units are provided a rank and the next highest-ranking power supply unit then becomes the primary and provides power. In this manner, redundant power supply is provided.

Figure 5:
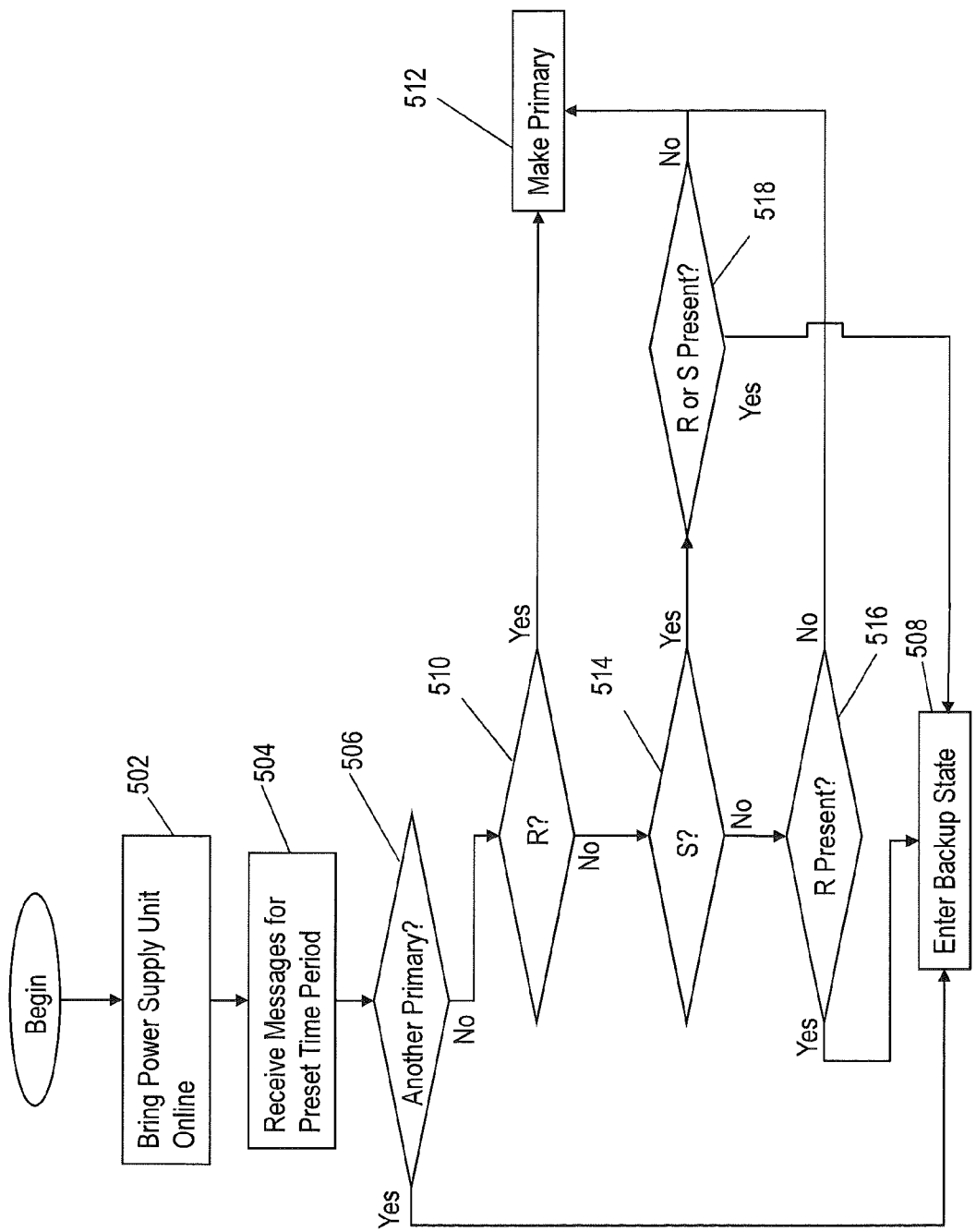
FIG. 5 is a flow chart showing a method according to one embodiment.

FIG. 5 is flow chart showing a method implemented when a power supply unit is powered on. In general, the method shown in FIG. 5 determines if the power supply being brought online is the primary and, if so, it can provide power. Otherwise, it does not, at least initially, provide power to the monitoring device.

At block 502 the power supply unit is brought online. At block 504 the power supply unit waits a preset time period and receives communications from any other active power supply units. In one embodiment, the preset time is 1.5 milliseconds after the power supply unit is deemed operational. This time period ensures that the power supply unit has had the opportunity to receive messages from all of the other active power supply units.

At block 506 the power supply unit determines if any of the received messages indicate that another power supply unit is the primary. If so, the power supply unit enters a backup state as indicated by block 508. That is, the power supply is not the primary and, therefore, is not providing power to the monitoring device.

Otherwise, processing moves to block 510. At block 510, it is determined if the power supply unit is an R power supply unit. If so, because it has already been determined that no other power supply unit is the primary, at block 512 the power supply unit is designated the primary. Otherwise, at block 514 it is determined if the power supply unit is an S power supply unit. If it is, then at block 516 it is determined if an R power supply unit is connected to it (based on the communications received in block 504). If no R power supply unit is connected to the power supply unit, the S power supply unit is designated the primary at block 512. Otherwise, the power supply unit enters the backup state as indicated by block 508. If the power supply unit is not an S power supply unit, it must be a T power supply unit. Thus, if it is determined that either an S or R power supply unit is present at block 518, the power supply unit enters the backup state as indicated by block 508. Otherwise, the power supply unit is designated as the primary at block 512. It shall be understood that the processes of blocks 510, 514, 516 and 518 may collectively be referred to as a priority dispute resolution process.

Of course, and as described above, the power supply unit will remain in either block 508 or 512 until something changes to cause it to transition out of either of those blocks. For example, if the power supply unit is the primary and becomes inoperable, it may indicate so by setting its excitation switchover flag. This causes the other power supply units to enter the dispute resolution process in one embodiment.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system comprising a plurality of power supply units (PSU), wherein each PSU is connected to another PSU by redundant communication links and a linear variable differential transformer (LVDT) excitation load, wherein each of the plurality of PSU comprises:

a communication module configured to provide bidirectional communication of operating conditions of the PSU to the another PSU via the redundant communication links;

a power module coupled for communication to the communication module, the power module configured to produce excitation power to the LVDT excitation load, the power module comprising:

a power source;

a sensing unit electrically coupled to the power source and configured to determine operating parameters of the power module;

a control unit electrically coupled to the sensing unit; and a switching module electrically coupled to the control unit, wherein the switching module configured to selectively connect and disconnect the power source to the LVDT excitation load in response to a signal from the control unit.

2. The system of claim 1 wherein the control unit is configured to determine when the another PSU is transmitting the excitation power to the LVDT excitation load and transmit the signal to the switching module in response to determining the another PSU is not transmitting the excitation power to the LVDT excitation load.

3. The system of claim 2 wherein the communication module is further configured to bidirectionally transmit and receive redundant status information of the PSU with the another PSU via the redundant communication links.

4. The system of claim 1 wherein the sensing unit is a current monitor.

5. The system of claim 4 further comprising a voltage monitor electrically coupled between the power source and the control unit.

6. The system of claim 1 wherein the power source is an A.C. power source.

7. A system comprising a plurality of power supply units (PSU), wherein each PSU is connected to another PSU by redundant communication links and configured to provide a single excitation voltage to a linear variable differential transformer (LVDT) excitation load, wherein each of the plurality of PSU comprises:
    a communication module configured to provide bidirectional communication of operating conditions of the PSU to the another PSU via the redundant communication links;
    a power module configured to produce excitation power to the LVDT excitation load, the power module comprising:
        an A.C. power source configured to provide the single excitation voltage;
        a sensing unit electrically coupled to the power source and configured to determine operating parameters of the power module;
        a control unit electrically coupled to the sensing unit and the communication module; and
        a switching module electrically coupled to the control unit, wherein the switching module is configured to selectively connect and disconnect the power source to the LVDT excitation load in response to a signal from the control unit.

8. The system of claim 7 wherein the control unit is configured to determine when the another PSU is transmitting the excitation power to the LVDT excitation load and transmit the signal to the switching module in response to determining the another PSU is not transmitting the excitation power to the LVDT excitation load.

9. The system of claim 7 wherein the sensing unit is a current monitor.

10. The system of claim 7 wherein the sensing unit is a voltage monitor.

11. The system of claim 7 wherein the communication module is further configured to bidirectionally transmit and receive redundant status information of the PSU with the another PSU via the redundant communication links.

12. A system comprising:
    a first power supply unit comprising a first communications module electrically coupled to a first power module, the first power module comprising:
        a first A.C. power source configured to provide a single excitation voltage to a linear variable differential transformer (LVDT) load;
        a first sensing unit electrically coupled to the first A.C. power source and configured to determine a first operating parameters of the first power module;
        a first control unit electrically coupled to the first sensing unit; and
        a first switching module electrically coupled to the first control unit, wherein the first switching module selectively connects and disconnect the first A.C. power source to a first input line;
    a second power supply unit comprising a second communications module electrically coupled to a second power module, the second power module comprising:
        a second A.C. power source configured to provide the single excitation voltage to the LVDT load;
        a second sensing unit electrically coupled to the second A.C. power source and configured to determine a second operating parameters of the second power module;
        a second control unit electrically coupled to the second sensing unit; and
        a second switching module electrically coupled to the second control unit, wherein the second switching module configured to selectively connect and disconnect the second A.C. power source to a second input line;
    redundant communication links coupled for communication between the first communications module and the second communications module; and
    wherein the LVDT load is electrically coupled to the first input line and the second input line to receive the single excitation voltage from the first power supply unit or the second power supply unit.

13. The system of claim 12 wherein the first sensing unit is a first current monitor.

14. The system of claim 13 further comprising a first voltage monitor electrically coupled between the first A.C. power source and the first control unit.

15. The system of claim 12 wherein the first control unit is configured to determine when the second power supply unit is transmitting an excitation power to the LVDT load and transmit a signal to the first switching module in response to determining the second power supply unit is not transmitting the excitation power to the LVDT load.

16. The system of claim 15 wherein the first control unit is configured to transmit redundant primary status information to the second control unit via the redundant communication links.

* * * * *